United States Patent
Ono et al.

(10) Patent No.: US 7,164,974 B2
(45) Date of Patent: Jan. 16, 2007

(54) VEHICLE ROLL SENSING USING LOAD SHIFT ESTIMATION

(75) Inventors: Eiichi Ono, Aichi-ken (JP); Yuji Muragishi, Aich-ken (JP); Hiroaki Aizawa, Aichi-ken (JP); Hiroaki Niino, Aichi-ken (JP); Yoshiyuki Yasui, Aichi-ken (JP); Minekazu Momiyama, Aichi-ken (JP); Hiroaki Kato, Aichi-ken (JP)

(73) Assignees: Advics Co., Ltd., Kariya (JP); Toyoda Koki Kabushiki Kaisha, Kariya (JP)

( * ) Notice: Subject to any disclaimer, the term of this patent is extended or adjusted under 35 U.S.C. 154(b) by 350 days.

(21) Appl. No.: 10/895,120

(22) Filed: Jul. 21, 2004

(65) Prior Publication Data

US 2005/0049778 A1 Mar. 3, 2005

(30) Foreign Application Priority Data

Jul. 22, 2003 (JP) ............................. 2003-199726

(51) Int. Cl.
*G05D 1/00* (2006.01)
(52) U.S. Cl. .................... 701/1; 701/41; 701/70
(58) Field of Classification Search .................... 701/1, 701/36, 41, 42, 70, 71, 80; 73/73, 74, 146; 303/148, 149
See application file for complete search history.

(56) References Cited

U.S. PATENT DOCUMENTS

| 6,792,343 B1 * | 9/2004 | Yasui et al. | 701/71 |
|---|---|---|---|
| 6,895,317 B1 * | 5/2005 | Yasui et al. | 701/36 |
| 6,925,371 B1 * | 8/2005 | Yasui et al. | 701/72 |
| 6,931,313 B1 * | 8/2005 | Kato et al. | 701/41 |
| 6,941,213 B1 * | 9/2005 | Yasui et al. | 701/80 |
| 6,952,635 B1 * | 10/2005 | Yasui et al. | 701/41 |
| 7,069,135 B1 * | 6/2006 | Bertrand | 701/80 |
| 2004/0019417 A1 | 1/2004 | Yasui et al. | |

FOREIGN PATENT DOCUMENTS

JP 2001-071787 3/2001

* cited by examiner

*Primary Examiner*—Richard M. Camby
(74) *Attorney, Agent, or Firm*—Buchanan Ingersoll & Rooney PC

(57) ABSTRACT

In vehicle roll sensing of the present invention, a self-aligning torque (SAT) estimator estimates a composite value of SATs generated on tire contact patch of right and left wheels. A slip angle computer detects a vehicle speed and a steering angle and computes a slip angle of the wheel from the measured vehicle speed and steering angle. An SAT model value computer estimates an SAT model value as a composite value of SATs of the right and left wheels when no load shifts between the right and left wheels on the basis of the slip angle. A load shift ratio estimator estimates a load shift state of the right and left wheels on the basis of the composite value of the SATs of the wheels and the SAT model value. A vehicle rollover estimator estimates a rollover of the vehicle on the basis of the estimated load-shift state.

14 Claims, 5 Drawing Sheets

VEHICLE ROLL SENSING USING LOAD SHIFT ESTIMATION

CROSS-REFERENCE TO RELATED APPLICATION

This application claims priority under 35 USC 119 from Japanese Patent Application No. 2003-199726, the disclosure of which is incorporated by reference herein.

BACKGROUND OF THE INVENTION

1. Technical Field

The present invention relates to roll state sensing including sensing of a load shift state. More particularly, the invention relates to estimation of a roll state of a vehicle, including an apparatus and method for estimating a load shift state in right and left wheels.

2. Description of the Related Art

Hitherto, methods of determining a rollover of a vehicle have been proposed. In a representative method, on a two-dimensional map using the roll angle and the roll velocity of a vehicle as parameters, a rollover region in which the roll angle and the roll velocity are relatively large and a non-rollover region in which the roll angle and the roll velocity are relatively small are set. A border line (threshold line) between the rollover region and the non-rollover region is changed according to a change direction of the steering angle of the vehicle. The state that the vehicle is at risk of rollover is determined when the history line of the actual roll angle and roll velocity of the vehicle crosses the border line (threshold line) (refer to Japanese Patent Application Laid-Open (JP-A) No. 2001-71787).

In this method, sensors are indispensable because the actual roll angle and roll velocity of a vehicle need to be detected and measured.

Consequently, an apparatus and method for estimating a load shift state of right and left wheels and an apparatus and method for estimating the roll state of a vehicle without measuring the roll angle and the roll velocity are demanded.

SUMMARY OF THE INVENTION

The present invention has been achieved in consideration of the above facts.

A first aspect of this invention is an apparatus which estimates a load shift state in right and left wheels. This apparatus includes a self-aligning torque (SAT) composite value estimating/detecting unit which estimates or detects a composite value of SATs generated on tire contact patch of right and left wheels, an SAT model value computing unit which computes an SAT model value as a composite value of SATs of the right and left wheels when no load shifts between the right and left wheels, and a load shift state estimating unit which estimates a load shift state of the right and left wheels on the basis of the composite value of the SATs estimated or detected by the SAT estimating/detecting unit and the SAT model value computed by the SAT model value computing unit.

The SAT composite value estimating/detecting unit of the invention estimates or detects a composite value of SATs generated on tire contact patch of right and left wheels.

The SAT model value computing unit computes an SAT model value as a composite value of SATs of the right and left wheels when no load shifts between the right and left wheels.

The apparatus may further include a slip angle estimating unit for estimating a slip angle of the wheel, and the SAT model value computing unit may estimate the SAT model value on the basis of the slip angle estimated by the slip angle estimating unit. In place of the slip angle of a wheel, the lateral force of the vehicle may be used. Specifically, the apparatus further includes a lateral force estimating unit for estimating a lateral force of a vehicle and the SAT model value computing unit may estimate an SAT model value on the basis of the lateral force estimated by the lateral force estimating unit. Alternatively, the apparatus may have a lateral direction state amount computing unit for computing a state amount in the lateral direction which is generated in the wheel, and the SAT model value computing unit may estimate the SAT model value on the basis of the lateral direction state amount computed by the lateral direction state amount computing unit.

As described above, the SAT model value is a composite value of SATs of right and left wheels when no load shifts between the right and left wheels. When there is a load shift between the right and left wheels, the right and left wheels are influenced by the load shift and a composite value of the SATs generated on the tire contact patch of the right and left wheels is larger than that of SATs when no load shifts between the right and left wheels. Therefore, from the composite value of SATs of the right and left wheels when no load shifts between the right and left wheels and the composite value of SATs generated on the tire contact patch of the right and left wheels, the influence of the load shift in the right and left wheels exerted on the composite value of the SATs generated in the tire contact patch of the right and left wheels can be grasped.

As described above, by using the composite value of SATs generating in the tire contact patch of the right and left wheels and the composite value of SATs when no load shifts between the right and left wheels, without detecting the roll angle and the roll velocity, the load shift state of the right and left wheels can be estimated.

The load shift state estimating unit estimates the load shift state of right and left wheels on the basis of the composite value of SATs estimated or detected by the SAT estimating/detecting unit and the SAT model value computed by the SAT model value computing unit.

A second aspect of the invention is a vehicle roll-state estimating apparatus. This apparatus includes an SAT composite value estimating/detecting unit which estimates or detects a composite value of SATs generated on tire contact patch of right and left wheels, an SAT model value computing unit which computes an SAT model value as a composite value of SATs of the right and left wheels when no load shifts between the right and left wheels, a load shift state estimating unit which estimates a load shift state of the right and left wheels on the basis of the composite value of the SATs estimated or detected by the SAT estimating/detecting unit and the SAT model value computed by the SAT model value computing unit, and a roll state estimating unit which estimates a roll state of the vehicle on the basis of the load shift state estimated by the load shift state estimating unit.

Like the apparatus of the first aspect of the invention, the load shift state estimating unit of the second aspect estimates a load shift state of the right and left wheels on the basis of the composite value of SATs estimated or detected by the SAT estimating/detecting unit and the SAT model value computed by the SAT model value computing unit.

When the load shift state of the right and left wheels is known, without detecting the roll angle and the roll velocity, the roll state of the vehicle can be recognized from the load shift state.

Therefore, the roll state estimating unit estimates the roll state of the vehicle on the basis of the load shift state estimated by the load shift state estimating unit.

The roll state estimating unit may estimate a rollover of the vehicle from the roll state of the vehicle.

The roll state estimating unit may estimate a roll state of the vehicle on the basis of a change state of the load shift state estimated by the load shift state estimating unit and the load shift state.

DETAILED DESCRIPTION OF THE INVENTION

Embodiments of the present invention will be described in detail hereinbelow with reference to the drawings.

Figure 1:
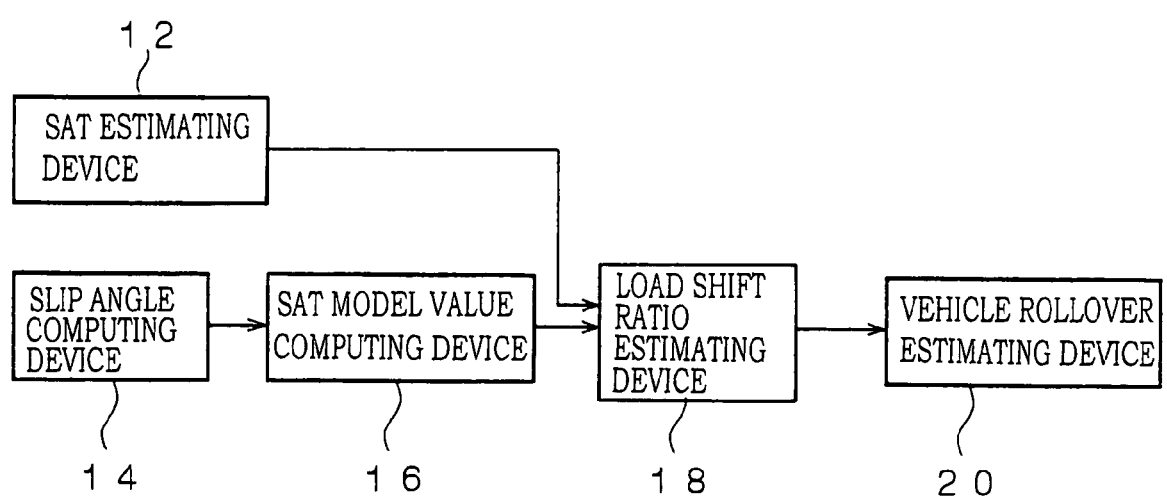
FIG. 1 is a block diagram of a vehicle roll-state estimating apparatus according to an embodiment of the present invention.

As shown in FIG. 1, a vehicle roll-state estimating apparatus including a load shift state estimating apparatus has an SAT (Self-Aligning Torque) estimator 12, a slip angle computer 14, an SAT model value computer 16, a load shift ratio estimator 18, and a vehicle rollover estimator 20. The SAT estimator 12 is as an SAT composite value estimation/detection unit which estimates a composite value of self aligning torques (SATs) generated on tire contact patch of right and left wheels (right and left front wheels in the embodiment). The slip angle computer 14 is as a slip angle estimation unit which measures vehicle speed and a steering angle and computes a slip angle of a wheel from the measured vehicle speed and steering angle. The SAT model value computer 16 is as an SAT model value computing unit which estimates an SAT model value as a composite value of SATs of the right and left wheels when no load shift exits in the right and left wheels on the basis of the slip angle computed by the slip angle computer 14. The load shift ratio estimator 18 is as a load shift state estimating unit which estimates a load shift state of right and left wheels on the basis of a composite value of SATs of the right and left wheels and the SAT model value. The vehicle rollover estimator 20 is as a roll-state estimating unit which estimates a vehicle rollover as a roll state of the vehicle on the basis of the estimated load shift state.

The principle of estimating a load shift state of right and left wheels and rollover of a vehicle will be described.

An SAT of a single wheel can be expressed by the following equation (ABE, Masato: "*Zidosha no undo to seigyo*" (Movement and Control of Vehicles), pp. 37–39, Tokyo, Sankaido, 1992).

$$T_{SAT} = -\frac{l}{6} c_f \tan\alpha \cdot \varepsilon \tag{1}$$

where l: tire contact length, $c_f$: cornering power, $\alpha$: slip angle, and $\varepsilon$: grip margin. The following expression is obtained.

$$\varepsilon = 1 - \frac{F_y}{\mu F_z} \tag{2}$$

where $F_y$: tire lateral force, $\mu$: road friction coefficient ($\mu$), and $F_z$: tire vertical load.

When the vertical load changes, the tire contact length increases in proportion to the square root of the vertical load, and the cornering power increases in proportion to the vertical load. That is, they can be expressed as follows.

$$l = l_0 \sqrt{\frac{F_z}{F_{z0}}} \tag{3}$$

$$c_f = c_{f0} \frac{F_z}{F_{z0}} \tag{4}$$

where 0 denotes the value of a no load-shift state. Because the lateral force can be approximated on assumption that it is generated in proportion to the load, the grip margins of the right and left wheels can be considered to be constant irrespective of a load shift. Consequently, an SAT of two wheels of the right and left wheels (composite value of SATs generated on the tire contact patch of the right and left wheels) transmitted to the steering shaft is expressed as follows.

$$T_s = -\frac{(l_l c_{fl} + l_r c_{fr})}{6g_h} \tan\alpha \cdot \varepsilon \tag{5}$$

$$= -\frac{l_0 c_{f0}}{6g_h} \left\{ (1+\Delta)^{\frac{3}{2}} + (1-\Delta)^{\frac{3}{2}} \right\} \tan\alpha \cdot \varepsilon$$

where subscripts r and l regarding the tire contact length and cornering power denote the right and left tires, respectively. $g_h$ denotes a overall steering gear ratio. $\Delta$ indicates the load fluctuation ratio of right and left front wheels and expresses as follows.

$$F_z = F_{z0} \cdot (1 \pm \Delta) \tag{6}$$

When the SATs of two right and left wheels transmitted to the steering shaft when no load shift occurs between the two right and left wheels are set as an SAT model value $T_{s0}$ (a composite value of the SATs of the right and left wheels when no load shift exists between the right and left wheels), the following expression is obtained.

$$T_{s0} = -\frac{l_0 c_{f0}}{3g_h} \tan\alpha \cdot \varepsilon \quad (7)$$

The lateral force can be expressed as a function of the slip angle as follows.

$$F_y = \mu F_z (1-\zeta_s^3) \quad (8)$$

where $\xi_s$ can be expressed as follows (see ABE).

$$\zeta_s = 1 - \frac{c_f}{3\mu F_z} \tan\alpha \quad (9)$$

The grip margin is expressed by substituting Expressions 8 and 9 into Expression 2.

$$\varepsilon = \left(1 - \frac{c_f}{3\mu F_z} \tan\alpha\right)^3 \quad (10)$$

Therefore, by setting µ to a high µ value at which a vehicle roll is expected, the grip margin can be computed from the slip angle by Expression 10. By substituting the grip margin into Expression 7, an SAT model value can be computed. Although the grip margin is estimated from the slip angle in this case, the grip margin may be also computed from a lateral force estimation value $\hat{F}_y$ as follows.

$$\varepsilon = 1 - \frac{\hat{F}_y}{\mu F_z} \quad (11)$$

The ratio γ between the SATs of the right and left two wheels transmitted to the steering shaft and the SAT model value is expressed as follows.

$$\frac{T_s}{T_{s0}} = \frac{1}{2}(1+\Delta)^{\frac{3}{2}} + \frac{1}{2}(1-\Delta)^{\frac{3}{2}} = \gamma \quad (12)$$

Therefore, by solving Expression 12 with respect to Δ, a load shift ratio can be obtained from the ratio between the SAT estimation value and the SAT model value.

Figure 2:
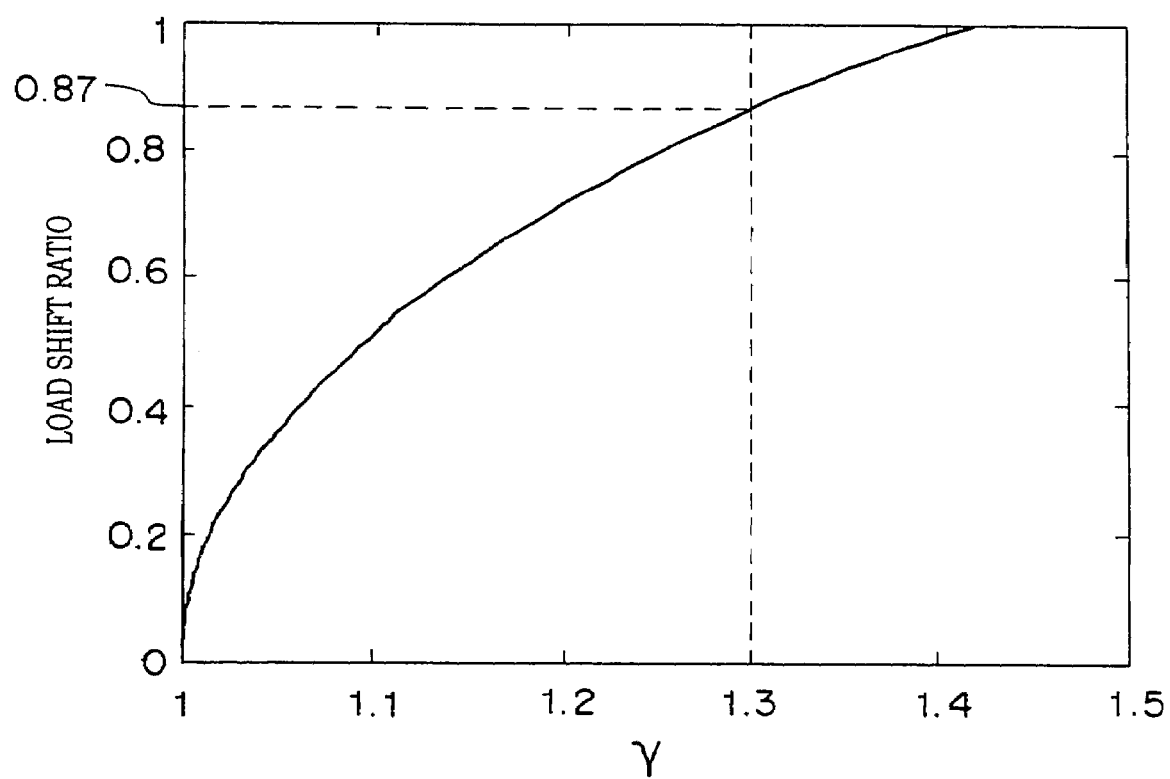
FIG. 2 is a graph showing the relation of the ratio $\gamma$ between SATs of two right and left wheels transmitted to the steering shaft and an SAT model value as SATs of the right and left wheels transmitted to the steering shaft when no load shift occurs between the right and left wheels, and a load shift ratio of the right and left wheels.

FIG. 2 shows a result of solving Equation 12 with respect to the load shift ratio. From FIG. 2, when the ratio γ between the SAT estimation value and the SAT model value becomes, for example, 1.3 or larger, the load shift ratio becomes 0.87 or higher, the load shift amount between the right and left two wheels is large, and there is a danger of rollover. That is, from the load shift ratio, a pre-rollover state of the vehicle and, further, rollover of the vehicle can be estimated.

An operation of the embodiment will now be described.

The SAT estimator 12 estimates an SAT generated between the road surface and a tire by removing the friction of a steering system from the sum of a steering wheel torque of the driver detected by a torque sensor attached to a not-shown steering wheel and an assist torque calculated by multiplying the current value of an electric power steering with a torque constant, thereby obtaining Ts of Equation 5.

Figure 3B:
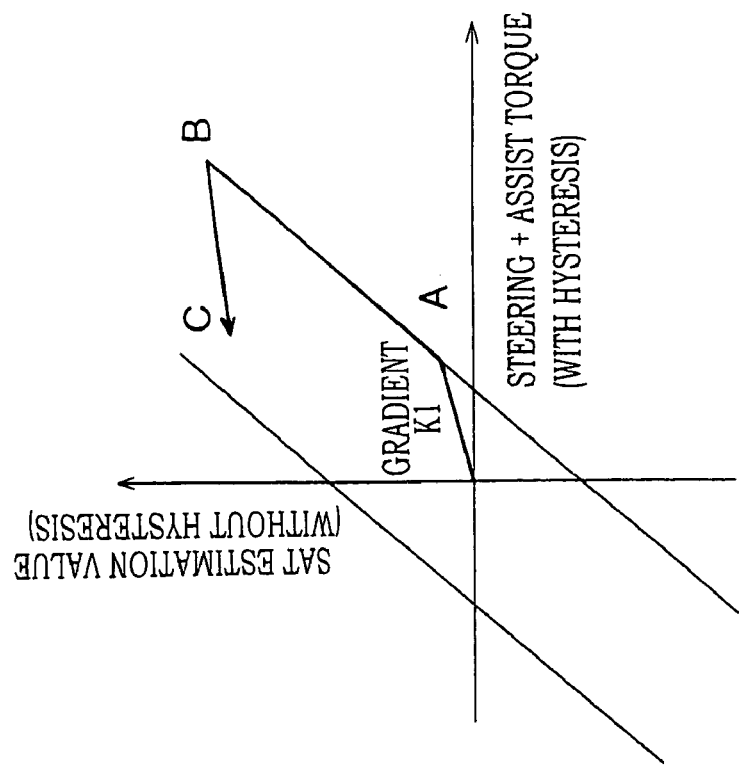
FIG. 3B is a diagram illustrating a method of computing the SAT evaluation value.
Figure 3A:
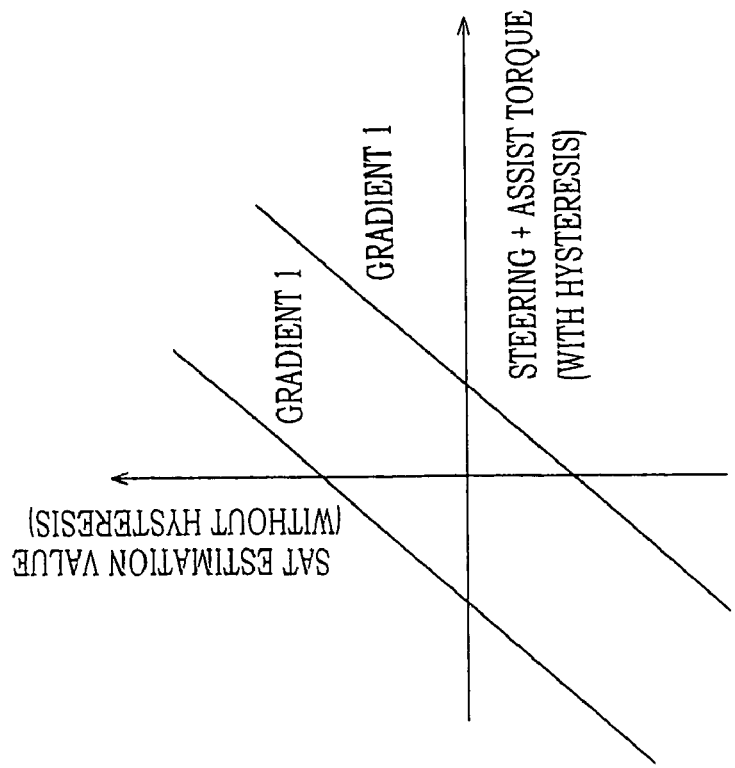
FIG. 3A is a diagram showing upper and lower limits of an SAT evaluation value.

The friction removal computation is executed by the following logic. The width between two straight lines in FIG. 3A shows the magnitude of a hysteresis which occurs due to friction of the steering system, and the gradient of each of the straight lines is 1. FIG. 3B illustrates the method of friction removal computation. In a straight travel state in which each of the sum of the steering wheel torque and the assist torque and the slip angle becomes zero, a hysteresis characteristic does not occur. As the SAT estimation value at this time, zero is output. When steering wheel is operated after that and an SAT is generated, the SAT estimation value is computed by the gradient of $K_1$ with respect to the sum of the steering wheel torque and the assist torque. In a computer, the SAT estimation value is computed by a discrete logic as follows.

$$T_{SAT}(k+1) = T_{SAT}(k) + K_1 \cdot (T_{DA}(k+1) - T_{DA}(k)) \quad (13)$$

where $T_{SAT}$ denotes an SAT estimation value, and $T_{DA}$ denotes the sum of the steering wheel torque and the assist torque. The gradient $K_1$ is set to be smaller than 1 and expresses that even when the sum of the steering wheel torque and the assist torque fluctuates due to the Coulomb's friction or the like, a fluctuation in the SAT estimation value is small. When steering wheel is operated, the computation value of the SAT estimation value by Equation 13 reaches the point A in FIG. 3B and the sum of the steering wheel torque and the assist torque increases, the SAT estimation value increases in accordance with the following equation along the lower limit of the model.

$$T_{SAT}(k+1) = T_{SAT}(k) + T_{DA}(k+1) - T_{DA}(k) \quad (14)$$

When the increase in the sum of the steering wheel torque and the assist torque by the steering operation ends at the point B and starts decreasing, the SAT estimation value decreases with a gradient $K_1$ in accordance with Expression 13. In this region, $K_1$ is set to decrease a fluctuation in the SAT estimation value against a fluctuation in the sum of the steering wheel torque and assist torque. This means that even if the steering effort of the driver is changed a little in a state where the steering at the time of turn is maintained, the SAT estimation value is not influenced by, for example, the Coulomb's friction of a power steering system. When the sum of the steering wheel torque and the assist torque decreases from the point B, reaches the point C and increases again at from the point C, the estimation value increases to the point B in accordance with the expression 13. When the sum of the steering wheel torque and the assist torque decreases from the point C and reaches the model upper limit, the SAT estimation value decreases along the upper limit in accordance with the equation 14.

Figures 4A, 4B:
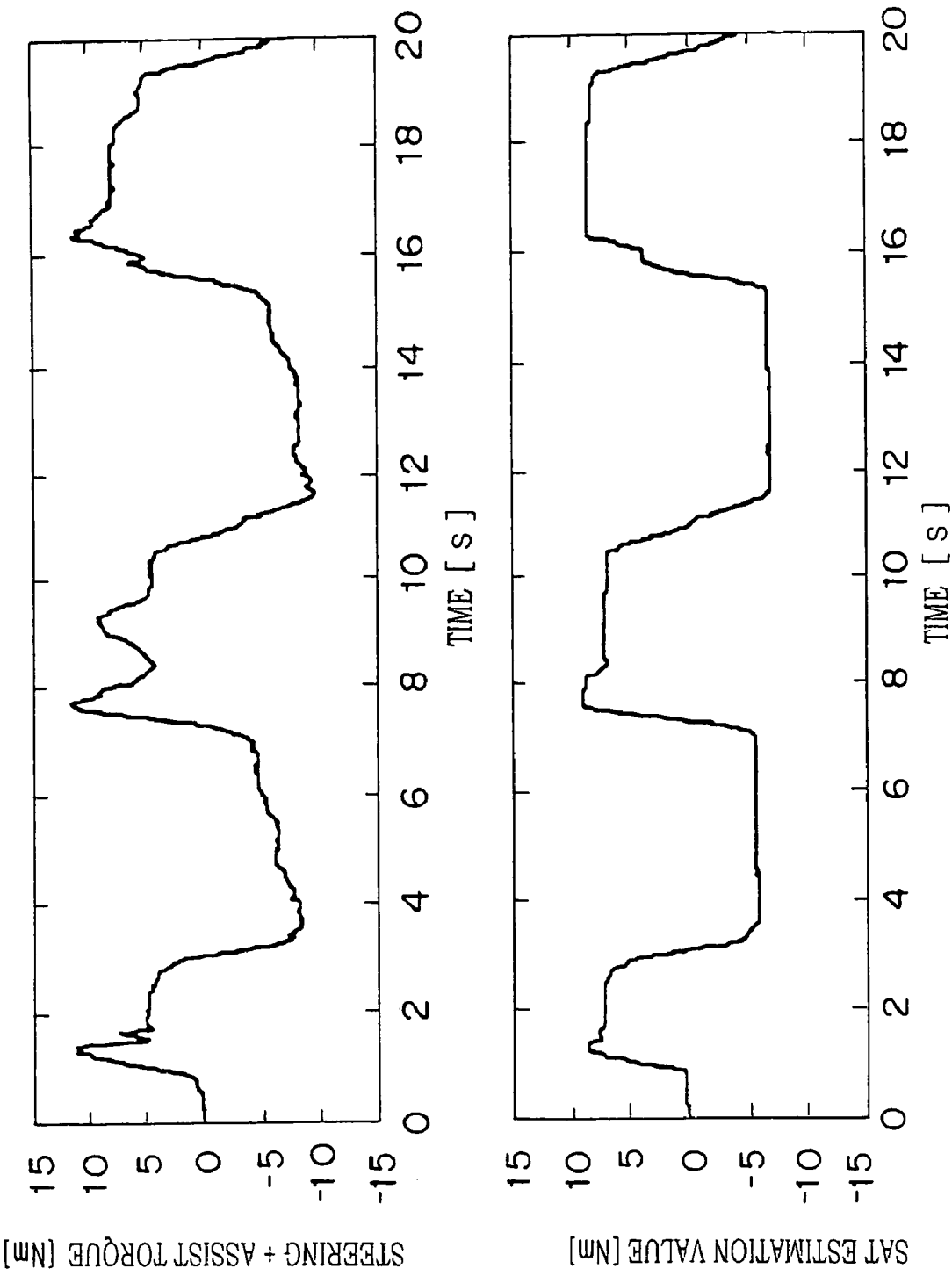
FIGS. 4A and 4B are diagrams illustrating an effect of hysteresis characteristic removal.

FIGS. 4A and 4B show the sum of the steering wheel torque and the assist torque when the vehicle travels with high road friction coefficient µ and the SAT estimation value obtained by removing the hysteresis characteristic from the sum on the basis of Equation 13 and 14. It is understood from the FIGS. 4A and 4B that the fluctuation when steering is maintained, of which cause is considered to be the influence of the Coulomb's friction or the like, is mostly compensated by an effect of removing the friction.

The slip angle computer 14 computes the slip angle of the front wheel on the basis of a vehicle linear model from the vehicle speed and the steering wheel angle.

$$\frac{d}{dt}\begin{bmatrix} v \\ r \end{bmatrix} = \left( \begin{bmatrix} 0 & -1 \\ 0 & 0 \end{bmatrix} u + \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix} \middle/ u \right) \begin{bmatrix} v \\ r \end{bmatrix} + \begin{bmatrix} \frac{c_f}{Mg_h} \\ \frac{L_f c_f}{I_z g_h} \end{bmatrix} \theta_p \quad (15)$$

$$\alpha_E = \begin{bmatrix} 1 & L_f \end{bmatrix} / u \begin{bmatrix} v \\ r \end{bmatrix} - \frac{\theta_p}{g_h} \quad (16)$$

where v: lateral velocity (m/s), r: yaw rate (rad/s), $\alpha_E$: estimated value (rad) of the slip angle of the front wheel, u: vehicle speed (M/s), $c_f$, $c_r$: cornering powers (N/rad) of front and rear wheels, $L_f$, $L_r$: distances between centers of gravity of front and rear axles, M: vehicle mass (kg), $I_z$: yaw moment of inertia (kgm$^2$), $g_h$: gear ratio between the steering wheel and actual steering, and $\theta_p$: steering wheel angle. Expressions 15 and 16 are discretized by sample time τ and expressed as functions of the vehicle speed as follows.

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_s / u(k) \right) x(k) + \tau B_s \theta_p(k) \quad (17)$$

$$\alpha_E(k) = \lfloor 1 L_f \rfloor x(k)/u(k) - \theta_p(k)/g_h \quad (18)$$

where $$A_s = \begin{bmatrix} -\frac{c_f + c_r}{M} & -\frac{L_f c_f + L_r c_r}{M} \\ -\frac{L_f c_f - L_r c_r}{I_z} & -\frac{L_f^2 c_f + L_r^2 c_r}{I_z} \end{bmatrix}, B_s = \begin{bmatrix} \frac{c_f}{Mg_h} \\ \frac{L_f c_f}{I_z g_h} \end{bmatrix}$$

The SAT model value computer 16 computes an SAT when no load shift exists in the right and left wheels in accordance with Expressions (7) and (10) on the basis of the slip angle.

The load shift amount estimator 18 calculates the ratio γ between the SAT estimation value and the SAT model value and, by using the map of FIG. 2, estimates the load shift ratio between the right and left wheels due to a vehicle turn from the ratio γ.

When the load shift ratio is equal to or higher than a predetermined value (for example, 0.87), the vehicle rollover estimator 20 determines that the probability of vehicle rollover is high.

Figure 5:
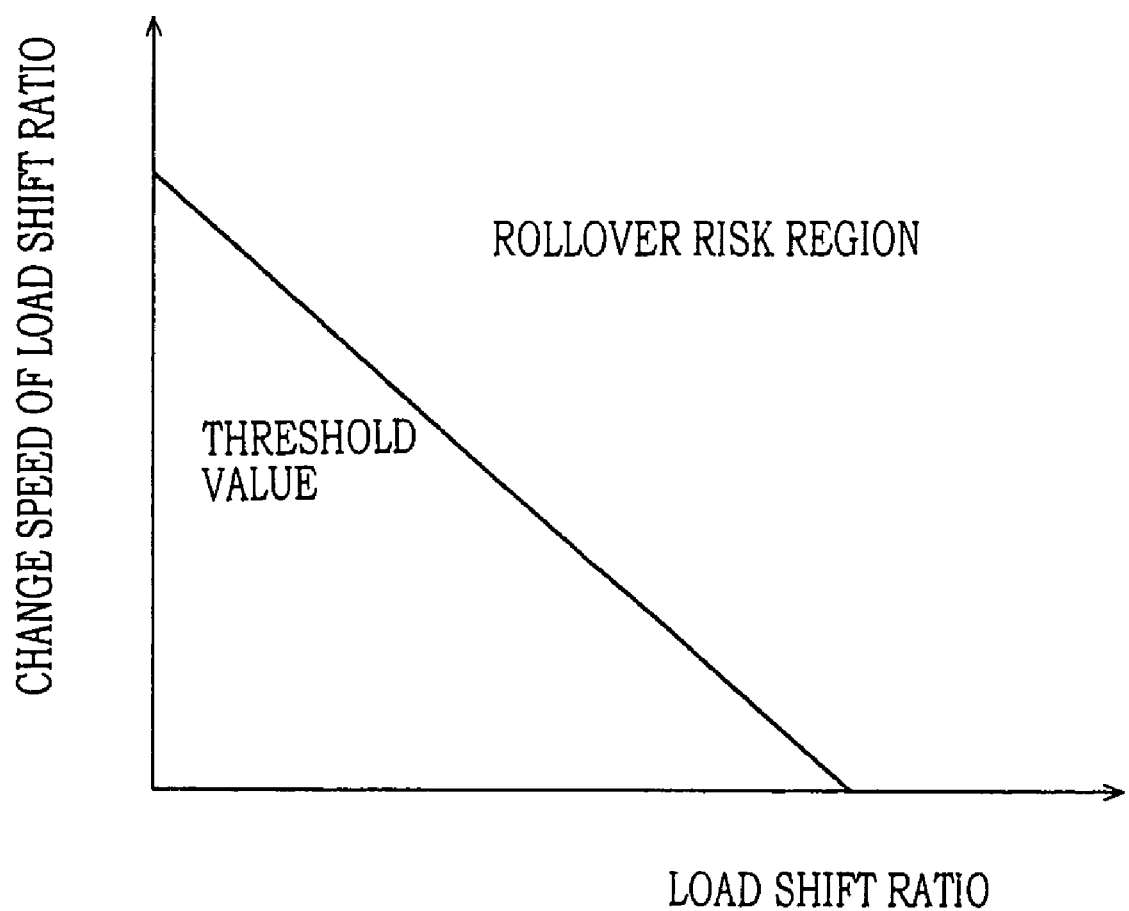
FIG. 5 is a diagram showing the relation between the load shift ratio and change speed of the load shift ratio, for estimating rollover of a vehicle.

The vehicle rollover estimator 20 can also determine the probability of a vehicle rollover on the basis of the load shift ratio and, in addition, a change speed of the load shift ratio on the basis of, for example, the map of FIG. 5. When the probability of a vehicle rollover is determined on the basis of the change speed of the load shift ratio in addition to the load shift ratio, as compared with the determination based on only the load shift ratio, a vehicle rollover can be estimated with higher precision.

As described above, in the embodiment, SATs of two right and left wheels transmitted to the steering shaft and SATs of two right and left wheels transmitted to the steering shaft when no load shift occurs between the right and left two wheels are used. Consequently, without detecting the roll angle and the roll velocity, the load shift state between the right and left wheels can be estimated. Further, without detecting the roll angle and the roll velocity, a rollover of a vehicle can be estimated.

Although the slip angle of the wheel is used in the foregoing embodiment, the invention is not limited to the slip angle. Alternatively, the lateral force of a wheel can be used.

Although the composite value of SATs of the right and left front wheels is determined by using the slip angle of the front wheel in the foregoing embodiment, the invention is not limited to the embodiment. A composite value of SATs of right and left front wheels may be determined by using the slip angle of the rear wheel.

As described above, in the invention, the composite value of SATs generated on the tire contact patch of right and left wheels and a composite value of SATs when no load shift exists between the right and left wheels are used. Consequently, the invention produces an effect such that the load shift state between right and left wheels can be estimated without detecting and measuring the roll angle and the roll velocity.

The invention uses the composite value of SATs generated on the tire contact patch of right and left wheels and a composite value of SATs when no load shift exists between the right and left wheels. Using the invention, the roll state of the vehicle can be estimated without detecting and measuring the roll angle and the roll velocity.

What is claimed is:

1. An apparatus for estimating a load shift state in wheels, comprising:
    a self-aligning torque composite value estimating/detecting unit which estimates or detects a composite value of self-aligning torques generated on tire contact patch of right and left wheels;
    a self-aligning torque model value computing unit which computes a self-aligning torque model value as a composite value of self-aligning torques of the right and left wheels when no load shift exists between the right and left wheels; and
    a load shift state estimating unit which estimates a load shift state of the right and left wheels on the basis of the composite value of the self-aligning torques estimated or detected by the self-aligning torque estimating/detecting unit and the self-aligning torque model value computed by the self-aligning torque model value computing unit.

2. The apparatus of claim 1, further comprising a slip angle estimating unit for estimating a slip angle of the wheel, wherein the self-aligning torque model value computing unit estimates the self-aligning torque model value on the basis of the slip angle estimated by the slip angle estimating unit.

3. An apparatus for estimating a roll state of a vehicle, comprising:

a self-aligning torque composite value estimating/detecting unit which estimates or detects a composite value of self-aligning torques generated on tire contact patch of right and left wheels;

a self-aligning torque model value computing unit which computes a self-aligning torque model value as a composite value of self-aligning torques of the right and left wheels when no load shift exists between the right and left wheels;

a load shift state estimating unit which estimates a load shift state of the right and left wheels on the basis of the composite value of the self-aligning torques estimated or detected by the self-aligning torque estimating/detecting unit and the self-aligning torque model value computed by the self-aligning model value computing unit; and a roll state estimating unit which estimates a roll state of the vehicle on the basis of the load shift state estimated by the load shift state estimating unit.

4. The apparatus of claim 3, wherein the roll state estimating unit estimates a rollover of the vehicle as the roll state of the vehicle.

5. The apparatus of claim 3, wherein the roll state estimating unit estimates a roll state of the vehicle on the basis of a change state of the load shift state estimated by the load shift state estimating unit and the load shift state.

6. A method of estimating a load shift state between a set of wheels of a vehicle, comprising:

determining a composite value of self-aligning torques generated on tire contact patch of a set of wheels;

computing a self-aligning torque model value as a composite value of the self-aligning torques of the wheels when no load shifts between the wheels; and estimating the load shift state of the wheels on the basis of the composite value of the self-aligning torques and the self aligning torque model value.

7. The method of claim 6, further comprising estimating a slip angle of the wheel, wherein computation of the self aligning torque model value is estimation of the self-aligning torque model value on the basis of the slip angle estimated.

8. The method of claim 6, further comprising estimating a roll state of the vehicle on the basis of the load shift state.

9. The method of claim 8, wherein the estimation of the roll state of the vehicle includes estimation of a rollover of the vehicle from the roll state of the vehicle.

10. The method of claim 8, wherein the estimation of the roll state includes estimation of a roll state of the vehicle on the basis of a change state of the load shift state and the load shift state.

11. The method of claim 6, wherein the determination of the self-aligning torque composite value includes estimation of the composite value.

12. The method of claim 6, wherein the determination of the self-aligning torque composite value includes detection of the composite value.

13. The method of claim 6, wherein the estimation of the load shift state of the wheels includes calculation of a load shift ratio of the wheels.

14. The method of claim 13, wherein the estimation of the load shift state of the wheels further includes calculation of a change velocity of the load shift ratio.

* * * * *